US010889225B2

(12) United States Patent
Jeunehomme et al.

(10) Patent No.: US 10,889,225 B2
(45) Date of Patent: Jan. 12, 2021

(54) VEHICLE INTERIOR EQUIPMENT PART, ASSOCIATED VEHICLE AND MANUFACTURING METHOD

(71) Applicant: FAURECIA AUTOMOTIVE INDUSTRIE, Nanterre (FR)

(72) Inventors: Franck Jeunehomme, Montherme (FR); Anne-Sophie Debruyne, Charleville-Mezieres (FR); Philippe Marcq, Mouzon (FR)

(73) Assignee: FAURECIA AUTOMOTIVE INDUSTRIE, Nanterre (FR)

( * ) Notice: Subject to any disclaimer, the term of this patent is extended or adjusted under 35 U.S.C. 154(b) by 24 days.

(21) Appl. No.: 16/287,556

(22) Filed: Feb. 27, 2019

(65) Prior Publication Data

US 2019/0263308 A1 Aug. 29, 2019

(30) Foreign Application Priority Data

Feb. 27, 2018 (FR) ...................................... 18 51700

(51) Int. Cl.
*B60N 3/06* (2006.01)
*B60N 3/04* (2006.01)
*B62D 65/14* (2006.01)
*B29L 31/30* (2006.01)

(52) U.S. Cl.
CPC ............. *B60N 3/063* (2013.01); *B60N 3/042* (2013.01); *B60N 3/06* (2013.01); *B62D 65/14* (2013.01); *B29L 2031/3041* (2013.01)

(58) Field of Classification Search
CPC . B60N 3/04; B60N 3/042; B60N 3/06; B60N 3/063; B60N 3/066; B62D 65/14

USPC .......................................................... 296/75
See application file for complete search history.

(56) References Cited

U.S. PATENT DOCUMENTS

| 4,779,295 | A | * | 10/1988 | Johansen | ................. B60N 3/06 |
| | | | | | 5/652 |
| 4,955,658 | A | | 9/1990 | Graves | |
| 4,991,900 | A | * | 2/1991 | White | ................... B60N 3/044 |
| | | | | | 296/75 |
| 6,158,766 | A | | 12/2000 | Kowalski | |
| 6,241,301 | B1 | | 6/2001 | Speth et al. | |
| 9,421,897 | B2 | * | 8/2016 | Bouillon | ................. B60N 3/066 |

FOREIGN PATENT DOCUMENTS

| FR | 1155624 | A | | 5/1958 | |
| GB | 2400350 | A | * | 10/2004 | ............. B60N 2/245 |
| GB | 2400350 | A | | 10/2004 | |

OTHER PUBLICATIONS

French Search Report corresponding to FR application No. 1851700, dated Oct. 12, 2018, 3 pages.

* cited by examiner

*Primary Examiner* — Jason S Daniels
(74) *Attorney, Agent, or Firm* — Reising Ethington P.C.

(57) ABSTRACT

A vehicle interior equipment part, intended to be attached on a floor of the vehicle, that provides a heel rest for an occupant. The part includes a floor element having a first portion intended to extend in a substantially horizontal plane and a second portion intended to extend in a tilted plane relative to the first portion. The part further includes an inflatable heel rest attached on the second portion, the heel rest being reversibly deployable between a retracted idle position in which the heel rest is substantially flush with the second portion, and a deployed position in which the heel rest protrudes relative to the second portion.

12 Claims, 4 Drawing Sheets

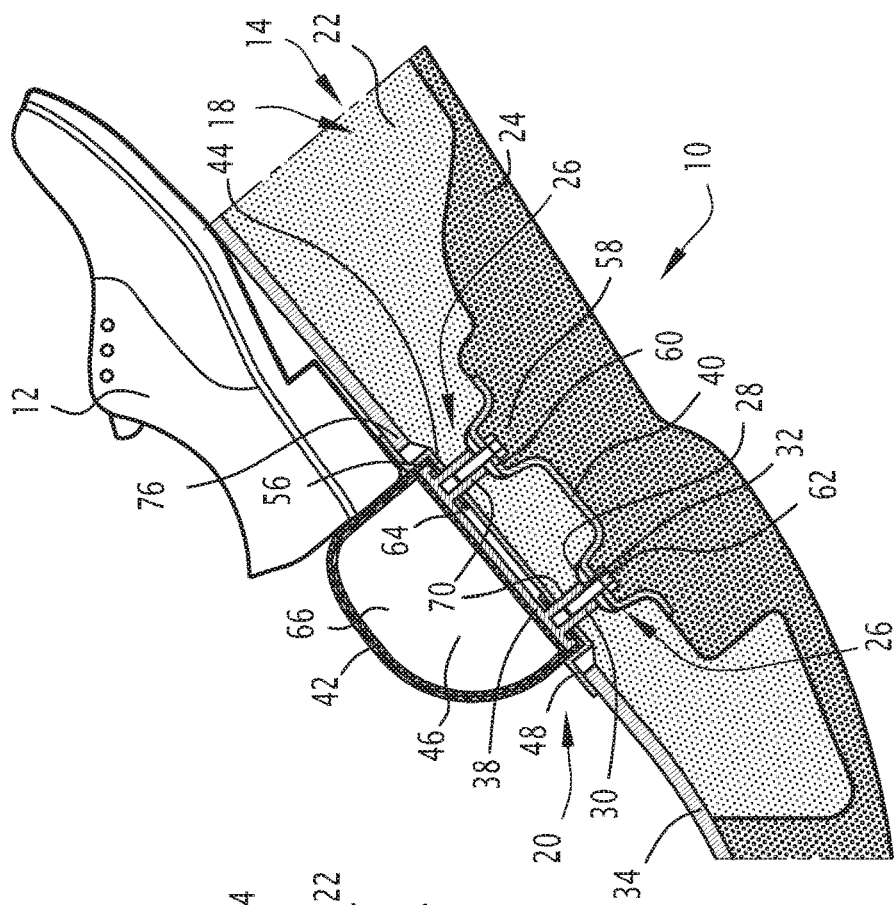
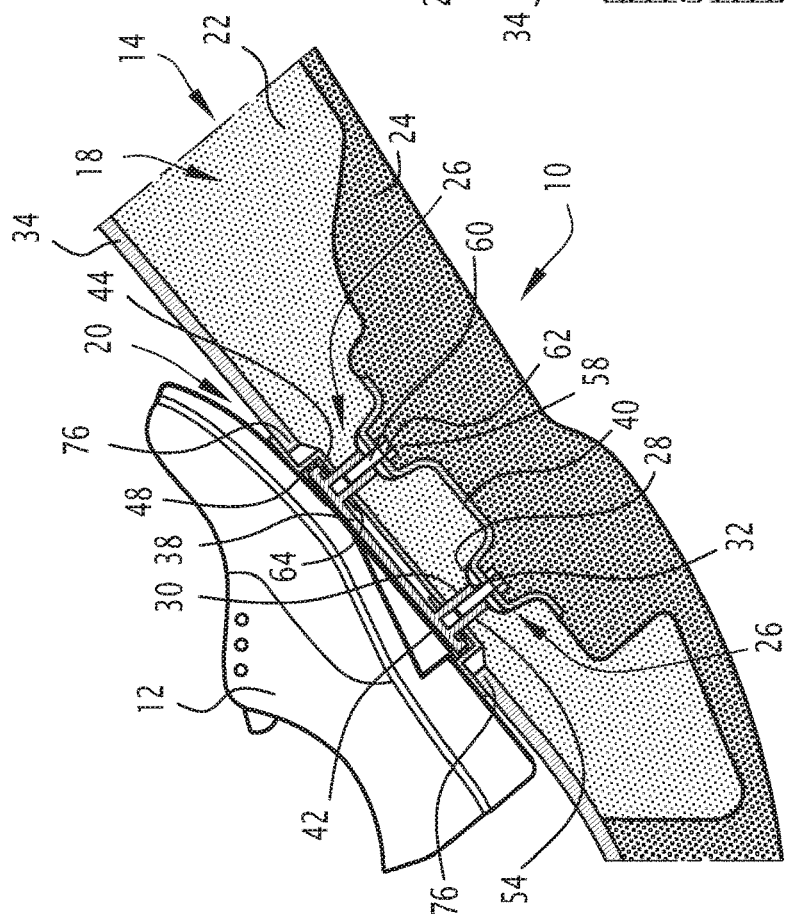

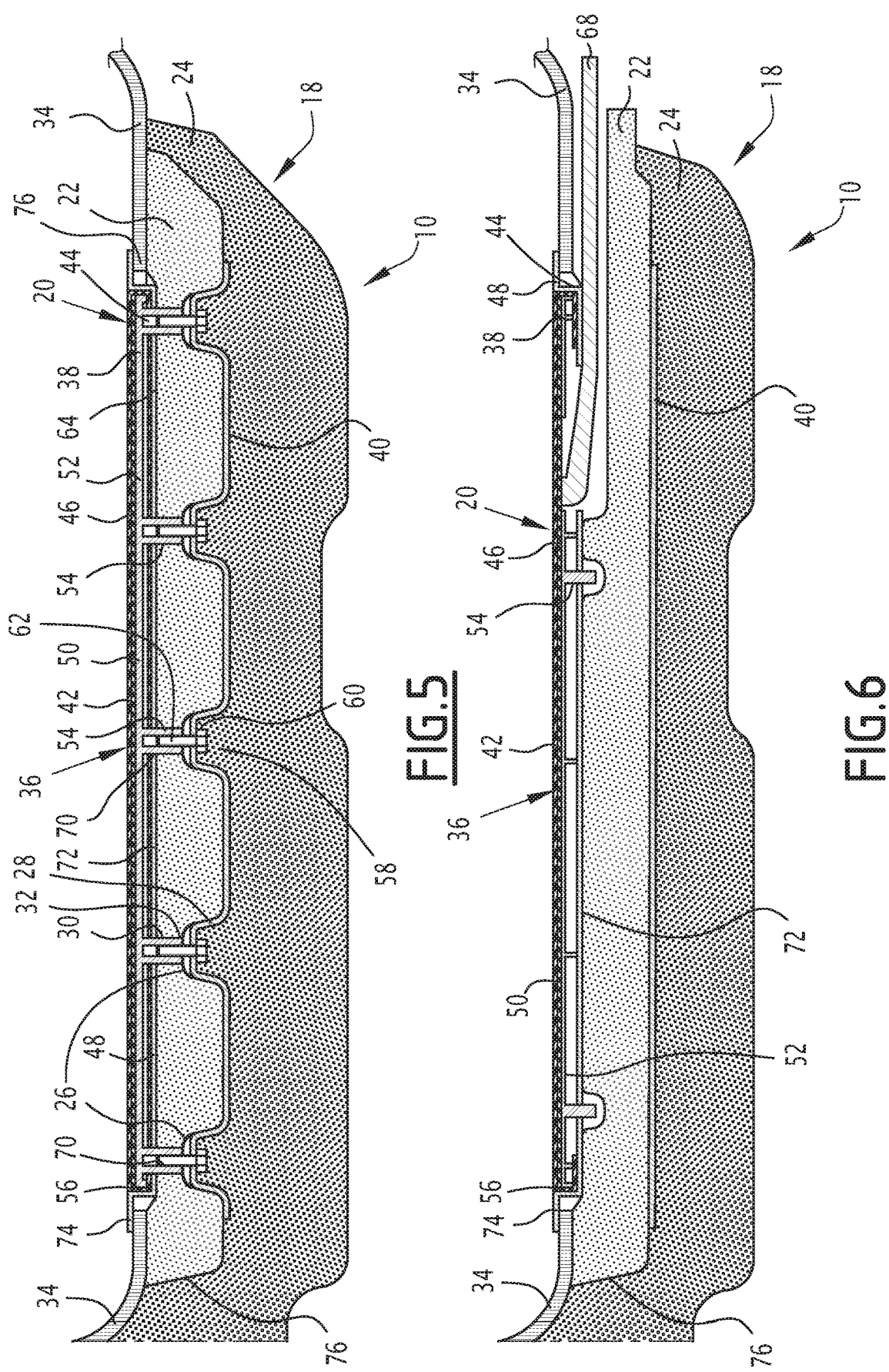

VEHICLE INTERIOR EQUIPMENT PART, ASSOCIATED VEHICLE AND MANUFACTURING METHOD

FIELD OF THE INVENTION

The present invention relates to a vehicle interior equipment part intended to be attached on a floor of the vehicle, the part comprising a floor element comprising a first portion intended to extend in a substantially horizontal plane and a second portion intended to extend in a tilted plane relative to the first portion.

DESCRIPTION OF RELATED ART

It frequently occurs, during a journey in a vehicle or when the vehicle is stopped, for the passenger located in the front of the vehicle to push the seat bottom back and/or recline the backrest of the seat, seeking a more comfortable and relaxed position.

Generally, concomitantly with the change in seat position, the passenger extends the legs and places the feet on the dashboard of the vehicle while looking for a position with optimal comfort. This position is difficult to find in light of the configuration of the dashboard and the morphology of the human body.

U.S. Pat. No. 6,158,766 describes a safety device comprising a cushion irreversibly inflatable below the carpet. Such a device is triggered only to protect the legs of an occupant of the vehicle.

SUMMARY

One aim of the invention is to obtain a vehicle interior equipment part that improves the comfort position of the passenger, in particular when the latter moves his seat and/or reclines the backrest thereof, and which is incorporated into the vehicle in an esthetically pleasing manner.

To that end, the invention relates to a vehicle interior equipment part of the aforementioned type, characterized in that the part further comprises an inflatable heel rest attached on the second portion, the heel rest being reversibly deployable between a retracted idle position in which the heel rest is substantially flush with the second portion, and a deployed position in which the heel rest protrudes relative to the second portion.

The part may comprise one or more of the following features, considered alone or according to any technically possible combination:
  the heel rest comprises an extensible layer attached by at least one peripheral edge on the second portion, the extensible layer being substantially flush with the second portion in the retracted position of the heel rest;
  the heel rest further comprises a support plate attached to the second portion and an inflatable membrane, the inflatable membrane being arranged between the support plate and the extensible layer, the peripheral edge of the extensible layer being pinched between the support plate and the second portion;
  the second portion comprises an upper layer and a lower layer, the lower layer being suitable for being applied on the floor of the vehicle, said upper and lower layers respectively being formed by a first and a second material respectively having a first stiffness and a second stiffness, the first stiffness being greater than the second stiffness, and the heel rest comprises a backplate arranged on a lower face of the upper layer, said backplate being attached to the support plate;
  the lower layer defines a recess for receiving the backplate;
  the backplate and the support plate are attached to one another by a plurality of screws;
  the floor element further comprises a layer of carpet attached on the second portion, the layer of carpet defining an opening intended to receive the heel rest;
  the heel rest further comprises a trim plate, the trim plate comprising a central zone bearing against the second portion and a peripheral zone pinching the layer of carpet along an exterior peripheral edge of the opening.

The invention also relates to a vehicle comprising:
  a floor defining a substantially horizontal rear region and a front region tilted relative to the rear region, the rear and front regions extending across from a passenger of the vehicle,
  an interior equipment part as previously described, the first portion bearing on the rear region of the floor, the second portion bearing on the front region of the floor.

The invention further relates to a method for manufacturing a vehicle interior equipment part intended to be attached on a floor of the vehicle, comprising the following steps:
  providing a floor element comprising a first portion intended to extend in a substantially horizontal plane and a second portion intended to extend in a tilted plane relative to the first portion,
  providing an inflatable heel rest, the heel rest being reversibly deployable between a retracted idle position in which the heel rest is substantially flush with the second portion, and a deployed position in which the heel rest protrudes relative to the second portion,
  attaching the heel rest on the second portion of the floor element.

The method may comprise one or more of the following features, considered alone or according to any technically possible combination:
  the step for providing a floor element comprises providing an upper layer of the second portion, the upper layer being formed from a first material having a first stiffness;
  the attachment step comprising attaching the heel rest to the upper layer, the method further comprising the following steps:
    providing a mold comprising a first half-mold and a second half-mold,
    inserting the upper layer and the heel rest into the first half-mold,
    closing the mold by using the second half-mold,
    injecting a second material having a second stiffness, the first stiffness of the first material being greater than the second stiffness of the second material, the second material forming a lower layer of the second portion of the floor element, the lower layer being suitable for being applied on the floor of the vehicle;
  the method further comprises providing a layer of carpet, the layer of carpet defining an opening intended to receive the heel rest,
  the provision step further comprising attaching the layer of carpet to the upper layer of the second portion of the floor element before the insertion into the first half-mold;

the method further comprises providing a trim plate, the step for attaching the heel rest further comprising a step for inserting the trim plate into the opening of the layer of carpet.

BRIEF DESCRIPTION OF THE DRAWINGS

The invention will be better understood upon reading the following description, provided solely as an example, and in reference to the appended drawings, in which:

FIGS. 3 and 4 are schematic sectional views along axis III-III of FIG. 1, in which the heel rest is respectively in the retracted idle position and the deployed position, FIGS. 5 and 6 are schematic sectional views respectively along axis V-V and axis VI-VI of FIG. 1 at the heel rest.

DETAILED DESCRIPTION

In the rest of this document, the orientations are the typical orientations of a motor vehicle. Thus, the terms "front", "rear", "left", "right", "above", "below", must be understood relative to the normal direction of movement of the vehicle.

Figure 1:
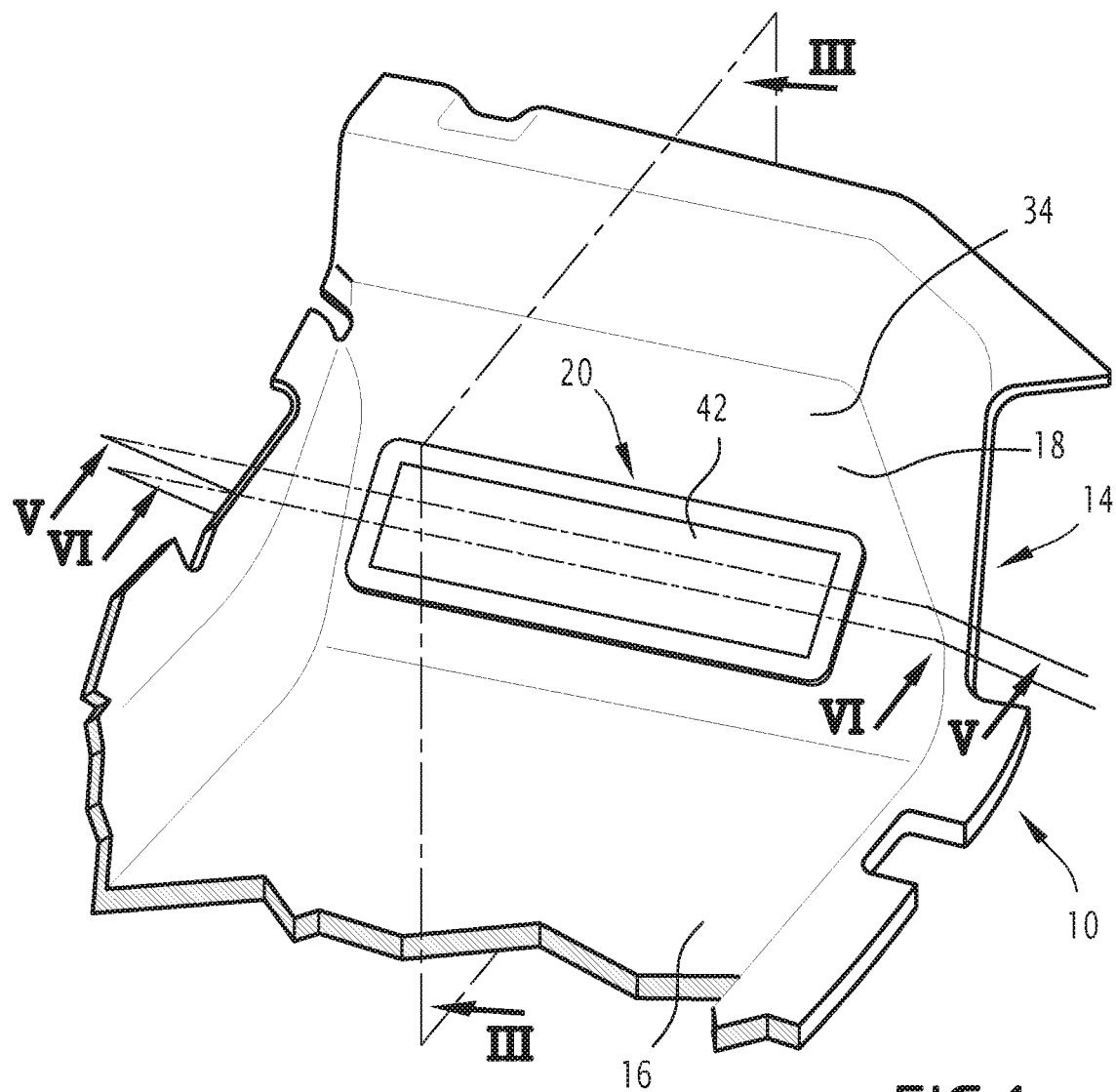
FIG. 1 is a perspective view of a first inner equipment part according to an embodiment of the invention in which the heel rest is in the retracted idle position.
Figure 2:
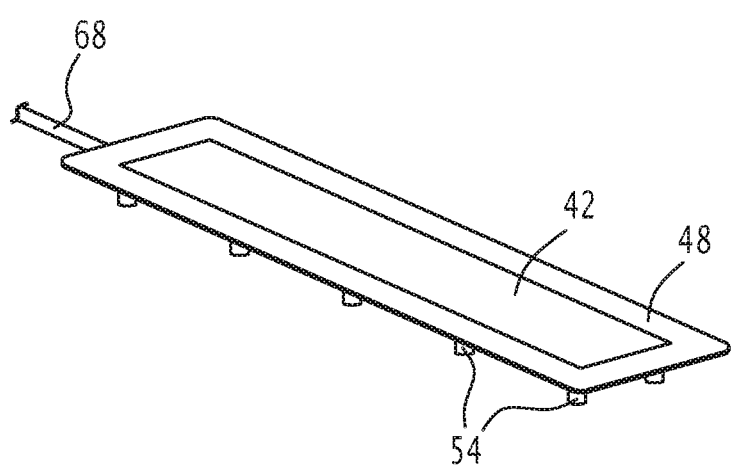
FIG. 2 is a perspective view of a portion of the heel rest of FIG. 1 in the retracted idle position.

An interior equipment part 10 of a vehicle is shown schematically in FIG. 1 and partially in FIGS. 2 to 6.

The interior equipment part 10 is intended to be attached on a floor of the vehicle (not shown).

In this example, the interior equipment part 10 is intended to be attached to the front of the motor vehicle at the floor (not shown) located across from the feet 12 of the passenger, in front of the passenger's seat.

Traditionally, in this location, the floor defines a substantially horizontal rear region and a front region tilted relative to the rear region. The rear and front regions extend across from the passenger of the vehicle.

The interior equipment part 10 comprises a floor element 14 including a first portion 16 intended to extend in a substantially horizontal plane and a second portion 18 intended to extend in a plane tilted forward relative to the first portion.

The interior equipment part 10 further comprises an inflatable heel rest 20 (FIG. 2) attached on the second portion 18. The heel rest 20 is reversibly deployable between a retracted idle position (FIG. 3) in which the heel rest 20 is substantially flush with the second portion 18, and a deployed position in which the heel rest 20 protrudes relative to the second portion 18.

The first portion 16 is intended to bear on the rear region of the floor and the second portion 18 is intended to bear on the front region of the floor.

In the illustrated example, the second portion 18 comprises an upper layer 22 and a lower layer 24.

The upper layer 22 defines a plurality of through cavities 26.

In this example, each through cavity 26 includes a frustoconical first portion 28 connected to a cylindrical second portion 30 defining a shoulder 32.

For example, the upper layer 22 is formed by expanded polystyrene (EPS).

The lower layer 24 is intended to be applied on the floor of the vehicle.

In this example, the lower layer 24 is a layer of foam.

The lower layer 24 is for example formed by injecting foam into a mold, as described later.

The layer of foam is preferably a layer of open-cell foam.

For example, the lower layer 24 is formed by a polyurethane foam (for example abbreviated PUR).

Advantageously, the upper layer 22 and the lower layer 24 respectively have a first stiffness and a second stiffness.

Preferably, the first stiffness is greater than the second stiffness.

The upper layer 22 and the upper layer 24 are typically insulating layers suitable for phonically insulating the inside of the vehicle from the outside of the vehicle.

In the illustrated example, the floor element 14 further comprises a layer of carpet 34 attached on the upper layer 22.

Carpet thus refers both to a textile product such as a needled product, and a plastic product such as a TPO (Thermoplastic Polyolefin) or PUR (Polyurethane) film.

The layer of carpet 34 is typically intended to give an enhanced esthetic appearance to the floor element 14.

The layer of carpet 34 advantageously defines an opening 36 intended to receive the heel rest 20.

The heel rest 20 for example extends in a main direction of elongation perpendicular to the longitudinal direction of the vehicle.

As shown in FIGS. 3 to 6, for example, the heel rest 20 comprises a support plate 38 arranged on the upper layer 22 of the second portion 18 of the floor element 14, a backplate 40 arranged on a lower face of the upper layer 22, on which the support plate 38 is attached, and an extensible layer 42 attached by at least one peripheral edge 44 on the second portion 18 of the floor element 14.

More particularly, in the embodiment of FIGS. 3 to 6, the backplate 40 is arranged between the upper layer 22 and the lower layer 24.

The heel rest 20 further comprises an inflatable membrane 46, arranged between the support plate 38 and the extensible layer 42, and advantageously a trim plate 48.

The support plate 38 comprises a substantially planar upper surface 50 and a lower surface 52 including a plurality of screwing shafts 54.

The screwing shafts 54 are intended to be inserted into the through cavities 26 of the upper layer 22 of the floor element 14.

The support plate 38 also comprises a folded peripheral edge 56 intended to be oriented toward the upper layer 22.

The support plate 38 for example has a rectangular shape.

The support plate 38 is made from plastic or composite material.

In this example, the backplate 40 comprises a plurality of recesses 58. Each recess 58 defines a through hole 60 intended to receive a screw 62 for attaching the backplate 40 to the support plate 38.

Advantageously, the recesses 58 are intended to be arranged in the cavities 26 of the upper layer 22 of the floor element 14.

The extensible layer 42 comprises a padded peripheral zone 64. It is folded toward the upper layer 22, below the support plate 38.

The padded peripheral zone 64 defines a plurality of holes at each of the screwing shafts 54.

Each hole receives a screwing shaft 54 of the support plate 38.

The extensible layer 42 is thus kept attached to the upper layer 22 by pinching of the peripheral zone 64 between the folded peripheral edge 56 of the support plate 38 and the upper layer 22 of the floor element 14, and more particularly between the folded peripheral edge 56 of the support plate 38 and the trim plate 48.

Advantageously, at the time of the attachment, and in the idle retracted position, the extensible layer 42 is stretched to avoid folds. This improves the esthetic appearance.

The extensible layer 42 is advantageously formed by a resilient material, for example TPU (Thermoplastic Polyurethane).

Preferably, the extensible layer 42 comprises at least one outer surface intended to be oriented toward the inside of the vehicle having esthetic qualities.

In the retracted idle position of the heel rest 20 (FIG. 3), the extensible layer is substantially flush with the second portion 18 of the floor element 14.

In the deployed position of the heel rest 20 (FIG. 4), the extensible layer 42 deforms and forms a bearing member 66 protruding relative to the floor element 14 and intended to receive the heel and the back of the foot 12 of the passenger.

In the retracted idle position, the inflatable membrane 46 bears on the support plate 38. It can also be in contact with the extensible layer 42. However, in the retracted idle position, the inflatable membrane 46 does not apply any force on the extensible layer 42.

In the deployed position, the inflatable membrane 46 is arranged bearing on the support plate 38 and on the extensible layer 42, and causes the deformation of the extensible layer 42 so as to form the bearing member 66.

The bearing member 66 then protrudes relative to the floor element 14 by 2 to 5 cm, preferably 3 cm.

In the retracted position, the inflatable membrane 46 has a thickness of 0.2 to 0.4 mm, preferably 0.3 mm.

In the retracted position, the inflatable membrane 46 has dimensions substantially identical to the dimensions of the planar surface of the support plate.

Advantageously, the inflatable membrane 46 is supplied with air by a supply hose 68 (FIG. 6).

Advantageously, the support plate 38, the trim plate 48 define volumes intended to receive the supply hose 68.

Likewise, the upper layer 22 of the floor element 14 defines a housing for receiving the supply hose 68.

For example, the supply hose 68 is connected to a pump (not shown) suitable for being controlled by the passenger by using a control device located for example on the armrest of the seat. The pump is preferably electric.

Alternatively, the pump is activated automatically based on the incline of the seat.

Advantageously, the pump is pooled. The pump is for example used by a massage device comprised in the seat of the vehicle.

The trim plate 48 defines a plurality of through orifices 70 for receiving screwing shafts 54.

The trim plate 48 comprises a central zone 72 bearing against the second portion 18 of the floor element 14 and a peripheral zone 74 protruding relative to the central zone 72 pinching the layer of carpet 34 along an exterior peripheral edge 76 of the opening 36 defined in the layer of carpet 34.

Thus, the trim plate 48 provides quality finishing while preventing the exterior peripheral edge 76 of the opening 36 of the layer of carpet 34 from loosening or unraveling.

Alternatively (FIG. 7), the lower layer 24 defines a recess 39 for receiving the backplate 40.

The backplate 40 is thus arranged on the lower face of the upper layer 22, away from and without contact with the lower layer 24.

Alternatively (not shown), the second portion 18 of the floor element 14 comprises only a layer of carpet and the heel rest 20 is attached to the layer of carpet, advantageously with a support plate 38 and backplate 40 assembly as previously described.

An operation of the interior equipment part 10 will now be described.

When the passenger uses the control device to activate the pump, the pump then supplies the inflatable membrane 46 of the heel rest 20 with air via the supply hose 68. The inflatable membrane 46 then receives a predetermined volume of air.

The inflatable membrane 46 becomes deformed and in turn deforms the extensible layer 42 of the heel rest 20. The inflatable membrane 46 and the extensible layer 42 then form a bearing member 66 protruding relative to the surface of the floor element 14 of the vehicle.

The passenger next places the heels and/or the backs of the feet 12 bearing against the bearing member 66 (FIG. 4). The pressure in the inflatable membrane 46 remains constant and is not influenced by the backpressure exerted by the heel of the passenger.

When the passenger changes positions and returns to his initial position for example, or if he no longer wishes to use the heel rest 20, the passenger uses the control device to deflate the inflatable membrane 46. The inflatable membrane 46 and the extensible membrane 42 deform again, reversibly, to regain their retracted idle position in which the extensible layer 42 is substantially flush with the floor element 14.

A method for manufacturing a vehicle interior equipment part 10 will now be described.

Initially, the trim plate 48 is arranged inside the opening 36 of the layer of carpet 34 of the floor element 14. The trim plate 48 is arranged on the face of the floor element 14 intended to be visible inside the vehicle, so as to place the central zone 72 of the trim plate 48 bearing against the upper layer 22 of the floor element 14.

The support plate 38, the inflatable membrane 46 and the extensible layer 42 are next arranged in the opening 36.

More particularly, the screwing shafts 54 of the support plate 38 are inserted into the through cavities 26 of the upper layer 22 of the floor element 14.

Concomitantly, the extensible layer 42 is stretched and the peripheral zone 44 is padded below the folded peripheral edge 56 of the support plate 38.

The backplate 40 is then arranged on the inner face of the upper layer 22 by arranging the recesses 58 across from the through cavities 26 of the upper layer 22.

The backplate 40 is next attached by screwing, heading or any other means of attaching to the support plate 38.

The upper layer 22 and the heel rest 20 are next arranged inside a half-mold.

The mold is next closed by using a second half-mold.

The material of the lower layer 24 of the floor element 14 is next injected inside the mold. The material thus marries the contours of the upper layer 22 of the floor element 14 and in particular fills the recesses 58 of the backplate 40.

After having respected a predetermined setting time that depends on the nature of the injected material, the interior equipment part 10 is obtained by stripping.

A second manufacturing method will now be described.

This method is identical to the preceding method, with the exception that the backplate 40 is attached to the support plate 38 after the stripping step.

Thus, the upper layer 22 and the heel rest 20 are arranged inside a half-mold without the backplate 40.

Figure 7:
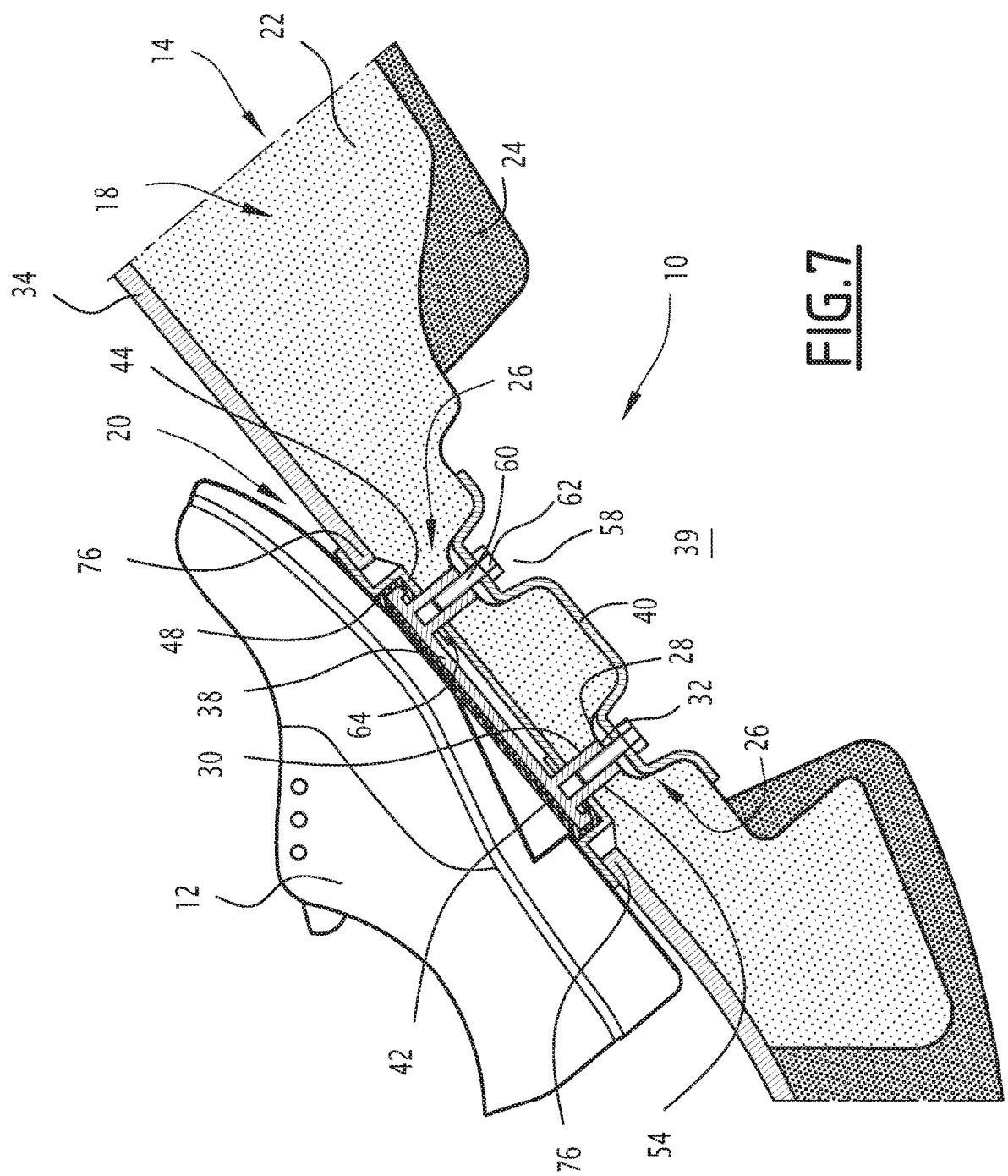
FIG. 7 is a schematic sectional view along axis III-III of a second part according to an embodiment of the invention, in which the heel rest is in the retracted idle position.

In this manufacturing mode, the second half-mold includes a resist, i.e., a partition, preventing the injected material from covering the backplate 40. After stripping, the equipment part 1 has a recess 39 as shown in FIG. 7. The method then comprises the insertion of the backplate 40 into the recess 39 and the attachment of the backplate 40 to the support plate 38 as previously described.

The advantage of this second method is to make the heel rest 20 detachable and therefore replaceable in case of malfunction or wear.

The interior equipment part 10 is particularly advantageous, since it comprises an inflatable heel rest that is deployable upon demand by the passenger. The heels and/or backs of the feet of the passenger can thus bear against the heel rest and passenger comfort is improved.

In the retracted position, the heel rest 20 is particularly thin, which makes it easier to integrate into the floor element 14.

Furthermore, in the retracted position, the heel rest 20 is esthetically integrated into the vehicle.

Lastly, the method for attaching the heel rest 20 to the floor element 14 is simple and is compatible with the conventional methods for manufacturing floor elements.

The invention claimed is:

1. A vehicle interior equipment part, intended to be attached on a floor of the vehicle, the part comprising a floor element comprising a first portion intended to extend in a horizontal plane and a second portion intended to extend in a tilted plane relative to the first portion,
    wherein the part further comprises an inflatable heel rest attached on the second portion, the heel rest being reversibly deployable between a retracted idle position in which the heel rest is flush with the second portion, and a deployed position in which the heel rest protrudes relative to the second portion, and
    wherein the heel rest comprises an extensible layer attached by at least one peripheral edge on the second portion, the extensible layer being flush with the second portion in the retracted position of the heel rest.

2. The part according to claim 1, wherein the heel rest further comprises a support plate attached to the second portion and an inflatable membrane, the inflatable membrane being arranged between the support plate and the extensible layer, the peripheral edge of the extensible layer being pinched between the support plate and the second portion.

3. The part according to claim 2, wherein the second portion comprises an upper layer and a lower layer, the lower layer being suitable for being applied on the floor of the vehicle, said upper and lower layers respectively being formed by a first and a second material respectively having a first stiffness and a second stiffness, the first stiffness being greater than the second stiffness, and
    wherein the heel rest comprises a backplate arranged on a lower face of the upper layer, said backplate being attached to the support plate.

4. The part according to claim 3, wherein the lower layer defines a recess for receiving the backplate.

5. The part according to claim 3, wherein the backplate and the support plate are attached to one another by a plurality of screws.

6. The part according to claim 1, wherein the floor element further comprises a layer of carpet attached on the second portion, the layer of carpet defining an opening intended to receive the heel rest.

7. The part according to claim 6, wherein the heel rest further comprises a trim plate, the trim plate comprising a central zone bearing against the second portion and a peripheral zone pinching the layer of carpet along an exterior peripheral edge of the opening.

8. A vehicle comprising:
    a floor defining a horizontal rear region and a front region tilted relative to the rear region, the rear and front regions extending across from a passenger of the vehicle, and
    the interior equipment part according to claim 1, the first portion bearing on the rear region of the floor, the second portion bearing on the front region of the floor.

9. A method for manufacturing a vehicle interior equipment part intended to be attached on a floor of the vehicle, comprising the following steps:
    providing a floor element comprising a first portion intended to extend in a horizontal plane and a second portion intended to extend in a tilted plane relative to the first portion,
    providing an inflatable heel rest, the heel rest having an extensible layer and being reversibly deployable between a retracted idle position in which the heel rest is flush with the second portion, and a deployed position in which the heel rest protrudes relative to the second portion, and
    attaching the extensible layer of the heel rest by at least one peripheral edge on the second portion of the floor element such that the extensible layer is flush with the second portion in the retracted position of the heel rest.

10. A method for manufacturing a vehicle interior equipment part intended to be attached on a floor of the vehicle, comprising the following steps:
    providing a floor element comprising a first portion intended to extend in a horizontal plane and a second portion intended to extend in a tilted plane relative to the first portion,
    providing an inflatable heel rest, the heel rest being reversibly deployable between a retracted idle position in which the heel rest is flush with the second portion, and a deployed position in which the heel rest protrudes relative to the second portion, and
    attaching the heel rest on the second portion of the floor element; wherein:
    the step for providing a floor element comprises providing an upper layer of the second portion, the upper layer being formed from a first material having a first stiffness,
    the attachment step comprises attaching the heel rest to the upper layer, and
    the method further comprises the following steps:
        providing a mold comprising a first half-mold and a second half-mold,
        inserting the upper layer and the heel rest into the first half-mold,
        closing the mold by using the second half-mold, and
        injecting a second material having a second stiffness, the first stiffness of the first material being greater than the second stiffness of the second material, the second material forming a lower layer of the second portion of the floor element, the lower layer being suitable for being applied on the floor of the vehicle.

11. The method according to claim 10, further comprising providing a layer of carpet, the layer of carpet defining an opening intended to receive the heel rest,
 wherein the provision step further comprises attaching the layer of carpet to the upper layer of the second portion of the floor element before the insertion into the first half-mold.

12. The method according to claim 11, further comprising providing a trim plate, wherein the step for attaching the heel rest further comprises a step for inserting the trim plate into the opening of the layer of carpet.

\* \* \* \* \*